(12) United States Patent
Zhu et al.

US010620005B2

(10) Patent No.: US 10,620,005 B2
(45) Date of Patent: Apr. 14, 2020

(54) BUILDING HEIGHT CALCULATION METHOD, DEVICE, AND STORAGE MEDIUM

(71) Applicant: Baidu Online Network Technology (Beijing) Co., Ltd., Beijing (CN)

(72) Inventors: Chongli Zhu, Beijing (CN); Jinbao Chen, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 50 days.

(21) Appl. No.: 15/301,358

(22) PCT Filed: Dec. 7, 2015

(86) PCT No.: PCT/CN2015/096524
§ 371 (c)(1),
(2) Date: Sep. 30, 2016

(87) PCT Pub. No.: WO2017/054314
PCT Pub. Date: Apr. 6, 2017

(65) Prior Publication Data
US 2017/0261319 A1    Sep. 14, 2017

(30) Foreign Application Priority Data

Sep. 29, 2015  (CN) .......................... 2015 1 0631698

(51) Int. Cl.
*G06K 9/00*   (2006.01)
*G01C 11/14*  (2006.01)
(Continued)

(52) U.S. Cl.
CPC ................ *G01C 11/14* (2013.01); *G01C 5/00* (2013.01); *G01C 11/00* (2013.01); *G06T 3/0062* (2013.01);
(Continued)

(58) Field of Classification Search
None
See application file for complete search history.

(56) References Cited

U.S. PATENT DOCUMENTS 7,042,497 B2 *  5/2006  Gullichsen ............ G06T 3/0018
                                              348/207.99
8,339,456 B2 * 12/2012  Eledath .................. G06K 9/209
                                              348/154
(Continued)

FOREIGN PATENT DOCUMENTS

CN        1904559 A    1/2007
CN      102985932 A    3/2013
CN      103217144 A    7/2013

OTHER PUBLICATIONS

Zhang, CN 103217144 A, published on Jul. 24, 2013 (machine translation).*

(Continued)

Primary Examiner — Feng Niu
(74) Attorney, Agent, or Firm — Ice Miller LLP

(57) ABSTRACT

Embodiments of the present invention disclose a building height calculation method, device, and storage medium. The method includes: acquiring an original picture including an image of a building; projecting the original picture to a surface of a preset sphere to form a projected picture; performing an edge detection on the image of the building in the projected picture to acquire a pixel height of the building; determining a projection angle of the projection on the preset sphere based on the pixel height of the building; and determining a height of the building based on the projection angle and a distance between the building and a capturing position of the original picture. In the embodiments of the present invention, a projection angle of a building is determined based on an original picture including an image of the building, and the height of the building is (Continued)

determined based on the projection angle and a distance between the building and a capturing position of the original picture. Hence, the height of the building can be obtained automatically and quickly based on the picture without manual involvements, thus reducing the cost of acquisition while improving the acquisition efficiency.

9 Claims, 8 Drawing Sheets

(51) Int. Cl.
    *G06T 7/62*     (2017.01)
    *G06T 3/00*     (2006.01)
    *G01C 11/00*     (2006.01)
    *G06T 7/13*     (2017.01)
    *G06T 7/90*     (2017.01)
    *G01C 5/00*     (2006.01)
    *G06T 7/60*     (2017.01)

(52) U.S. Cl.
    CPC .................. *G06T 7/13* (2017.01); *G06T 7/60* (2013.01); *G06T 7/62* (2017.01); *G06T 7/90* (2017.01); *G06T 2207/10024* (2013.01)

(56) References Cited

U.S. PATENT DOCUMENTS

| | | | | |
|---|---|---|---|---|
| 9,098,746 | B2* | 8/2015 | Huang | G06K 9/00637 |
| 9,170,331 | B2* | 10/2015 | Aimin | G01S 17/023 |
| 9,256,961 | B2* | 2/2016 | Lynch | G09B 29/007 |
| 9,285,460 | B2* | 3/2016 | Haglund | G09B 9/48 |
| 9,404,764 | B2* | 8/2016 | Lynch | G01C 21/3638 |
| 9,514,524 | B2* | 12/2016 | Kurata | G06K 9/00248 |
| 9,596,399 | B2* | 3/2017 | Eledath | G06K 9/209 |
| 2007/0073524 | A1* | 3/2007 | Song | G01C 21/20 |
| | | | | 703/2 |
| 2007/0098251 | A1 | 5/2007 | Lu | |
| 2008/0101713 | A1* | 5/2008 | Edgar | G06T 3/0018 |
| | | | | 382/260 |
| 2009/0284601 | A1* | 11/2009 | Eledath | G06K 9/209 |
| | | | | 348/157 |
| 2011/0141321 | A1* | 6/2011 | Tang | G06T 5/006 |
| | | | | 348/240.99 |
| 2012/0265495 | A1* | 10/2012 | Aimin | G01S 17/023 |
| | | | | 703/1 |
| 2012/0275709 | A1 | 11/2012 | Huang et al. | |
| 2013/0169668 | A1 | 7/2013 | Lynch | |
| 2013/0182119 | A1* | 7/2013 | Eledath | G06K 9/209 |
| | | | | 348/159 |
| 2014/0002439 | A1 | 1/2014 | Lynch | |
| 2015/0049004 | A1* | 2/2015 | Deering | G02B 27/0172 |
| | | | | 345/8 |
| 2015/0323648 | A1* | 11/2015 | Haglund | G01C 21/20 |
| | | | | 701/4 |
| 2016/0253791 | A1* | 9/2016 | Kurata | G06K 9/00248 |
| | | | | 348/241 |
| 2017/0004748 | A1* | 1/2017 | Deering | G02B 27/0172 |
| 2017/0004749 | A1* | 1/2017 | Deering | G02B 27/0172 |
| 2017/0010468 | A1* | 1/2017 | Deering | G02B 27/0172 |
| 2018/0103210 | A1* | 4/2018 | Park | H04N 5/23296 |

OTHER PUBLICATIONS

Carroll, "A Warping Framework for Wide-Angle Imaging and Perspective Manipulation". Electrical Engineering and Computer Sciences, University of California at Berkeley, Aug. 16, 2013, Technical Report No. UCB/EECS-2013-152 (http://www.eecs.berkeley.edu/Pubs/TechRpts/2013/EECS-2013-152.html).*

Wikipedia, "Angle of view", published on Sep. 8, 2015 (Year: 2015).*

PCT/CN2015/096524, Extended European Search Report, dated May 3, 2019.

* cited by examiner

BUILDING HEIGHT CALCULATION METHOD, DEVICE, AND STORAGE MEDIUM

CROSS-REFERENCE TO RELATED APPLICATIONS

The present application is a U.S. national stage of, and claims the priority benefit of, International Patent Application Serial No. PCT/CN2015/096524, filed Dec. 7, 2015 and Chinese Patent Application Serial No. 201510631698.1, filed Sep. 29, 2015, the text and drawings of which are hereby incorporated by reference in their entireties.

TECHNICAL FIELD

The present invention relates to the field of electronic map presentation, and more particularly to a building height calculation method, device, and storage medium.

BACKGROUND

As smart terminal devices are increasingly more popular and ubiquitous, and more and more people choose to drive to visit family and relatives, to adventure and travel, electronic maps are used more frequently. A user can conveniently locate a target location by using an electronic map, or enter a keyword on the electronic map to search for relevant information about shops or tourist spots of interest.

In the prior art, because the screen size of a smart terminal is fixed, the size of the display area in the electronic map is constant. Therefore, high-quality points of interest (POI) need to be selected on the electronic map, and preferentially presented to the user. The high-quality points of interest are selected based on the following principle: the importance of high-rise buildings is higher than that of low buildings. Therefore, the height of a building becomes a key factor for measuring whether the building can be deemed as a high-quality point of interest.

At present, building height data is usually collected manually.

However, the method of manually collecting the building height has the problems of low efficiency and high cost.

SUMMARY

In view of this, the embodiments of the present invention provide a building height calculation method, device, and storage medium, which can acquire the height of a building more quickly, and reduce the cost of acquisition while improving the acquisition efficiency.

In a first aspect, the embodiments of the present invention provide a building height calculation method, the method including:

acquiring an original picture including an image of a building;

projecting the original picture to a surface of a preset sphere to form a projected picture;

performing an edge detection on the image of the building in the projected picture to acquire a pixel height of the image of the building;

determining a projection angle of the projection on the preset sphere based on the pixel height of the building; and determining a height of the building based on the projection angle and a distance between the building and a capturing position of the original picture.

In a second aspect, the embodiments of the present invention also provide a building height calculation device, the device including:

an original picture acquiring module configured to acquire an original picture including an image of a building;

a projection module configured to project the original picture to a surface of a preset sphere to form a projected picture;

an edge detection module configured to perform an edge detection on the image of the building in the projected picture to acquire a pixel height of the image of the building;

a projection angle determining module configured to determine a projection angle of the projection on the preset sphere based on the pixel height of the building; and a building height determining module configured to determine a height of the building based on the projection angle and a distance between the building and a capturing position of the original picture.

In a third aspect, the embodiments of the present invention provide a non-volatile computer storage medium, the computer storage medium storing one or more modules, wherein when the one or more modules are executed by an apparatus that executes a building height calculation method, the apparatus is caused to execute the following operations:

acquiring an original picture including an image of a building;

projecting the original picture to a surface of a preset sphere to form a projected picture;

performing an edge detection on the image of the building in the projected picture to acquire a pixel height of the image of the building;

determining a projection angle of the projection on the preset sphere based on the pixel height of the building; and determining a height of the building based on the projection angle and a distance between the building and a capturing position of the original picture.

In the building height calculation method, device, and storage medium provided by the embodiments of the present invention, a projection angle of a building is determined based on an original picture including an image of the building, and the height of the building is determined based on the projection angle and a distance between the building and a capturing position of the original picture. Hence, the height of the building can be obtained automatically and quickly based on the picture without manual involvements, thus reducing the cost of acquisition while improving the acquisition efficiency.

BRIEF DESCRIPTION OF THE DRAWINGS

In order to describe the technical solutions in the embodiments of the present invention more clearly, the accompanying drawings required in the description of the embodiments are briefly introduced. It is obvious that the accompanying drawings referred in the following description are merely some embodiments of the present invention. It would be appreciated by one of ordinary skill in the art that changes and replacements may be further made to these accompanying drawings without any creative efforts.

DETAILED DESCRIPTION OF PREFERRED EMBODIMENTS

The technical solutions disclosed in the embodiments of the present invention will be described clearly and completely below with reference to the accompanying drawings. It is obvious that the described embodiments are only some rather than all embodiments of the present invention. The described embodiments are intended to be used for illustrating the principles of the present invention rather than limiting the present invention to these specific embodiments. Based on the embodiments in the present invention, all other embodiments obtained by one of ordinary skill in the art without creative efforts shall fall into the protection scope of the present invention.

The First Embodiment

Figure 1A:
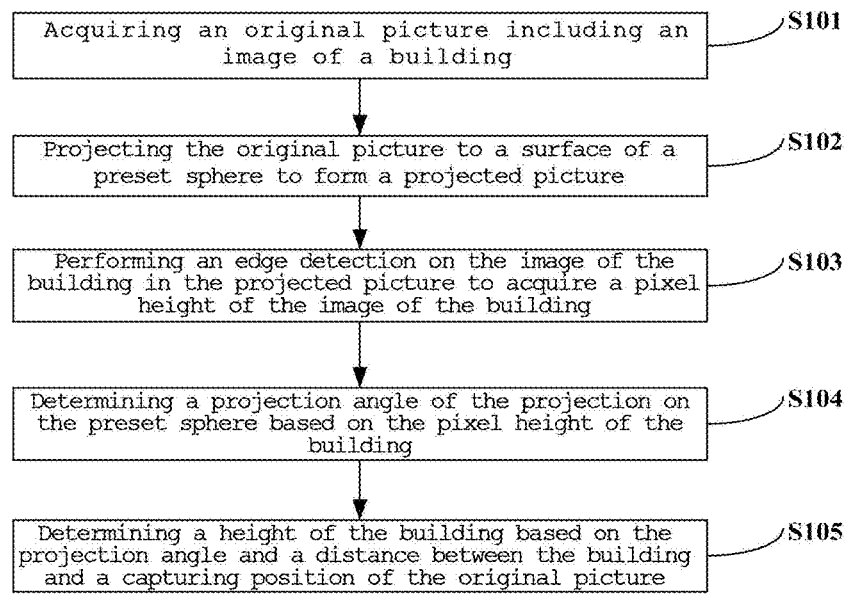
FIG. 1A is a flowchart of a building height calculation method according to a first embodiment of the present invention.

FIG. 1A is a flowchart of a building height calculation method according to the first embodiment of the present invention. The method may be executed by a building height calculation device. The device may be implemented in software and/or hardware, and is usually integrated in a server having a picture processing capability.

Referring to FIG. 1A, the method of this embodiment includes the following operations.

At step S101, an original picture including an image of a building is acquired.

In the above operation, the original picture may be a photograph of a building that is captured by using at least one camera. When the building is captured by using one camera, the photograph captured under a two-dimensional condition is used as the original picture. Alternatively, when the building is captured from different angles by using two or more cameras, a series of the captured photographs including the building image need to be processed and stitched together to obtain a panoramic picture that can display the entire building from bottom to top, and the panoramic picture under a two-dimensional condition is used as the original picture.

Preferably, the original picture in this embodiment may be a panoramic picture of the building that is captured from bottom to top.

At step S102, the original picture is projected to a surface of a preset sphere to form a projected picture.

The above original picture under a two-dimensional condition is attached as a texture to a surface of a preset three-dimensional sphere model, so as to form a projected picture.

Figure 1B:
FIG. 1B is a panoramic picture under a two-dimensional condition according to an embodiment of the present invention.

Specifically, it should be further noted that, a twisting and a deformation caused by a wide-angle distortion exist in the image of the original picture under the two-dimensional condition. As shown in FIG. 1B, the wide-angle distortion phenomenon in the panoramic picture under the two-dimensional condition causes a severe twisting and deformation in the panoramic picture. In addition, due to the wide-angle distortion phenomenon in the original picture, the actual height of the building cannot be calculated by directly using the original picture. Therefore, before the original picture is used for calculating the actual height of the building, the original picture needs to be attached as a texture to the surface of the preset sphere model to form a projected picture, to facilitate the elimination of the twisting and deformation caused by the wide-angle distortion in the image of the original picture in subsequent operations.

Preferably, before the original picture is projected to the surface of the preset sphere, the projection elevation angle of the original picture on the preset sphere needs to be determined based on the distance between the building and the capturing position of the original picture. The distance and the projection elevation angle have the following relationship: as the distance increases, a larger projection elevation angle is needed. In addition, provided that the distance is fixed, the size of the projection elevation angle is usually selected flexibly within an allowable range based on empirical values. The main purpose of determining the projection elevation angle is to eliminate the problem that the lower edge of the captured original picture may not be the lower edge of the building image, that is, the lower edge of the building image in the original picture may be inconsistent with the lower edge of the original picture. In this way, when the original picture is projected to the surface of the preset sphere to form the projected picture, the lower edge of the building image in the original picture is basically consistent with the lower edge of the projected picture. For example, when the distance between an image capturing vehicle and a building is known, and the capturing vehicle captures a panoramic picture of the building upward from the capturing vehicle, the distance between the building in the panoramic picture and the lower edge of picture can be approximately estimated, based on which the projection elevation angle is calculated, so that the distance between the lower edge of the building and the lower edge of the picture can be removed by virtue of the projection. Although the calculated distance is not precise, the error is acceptable with respect to the height of the entire building.

Figure 1C:
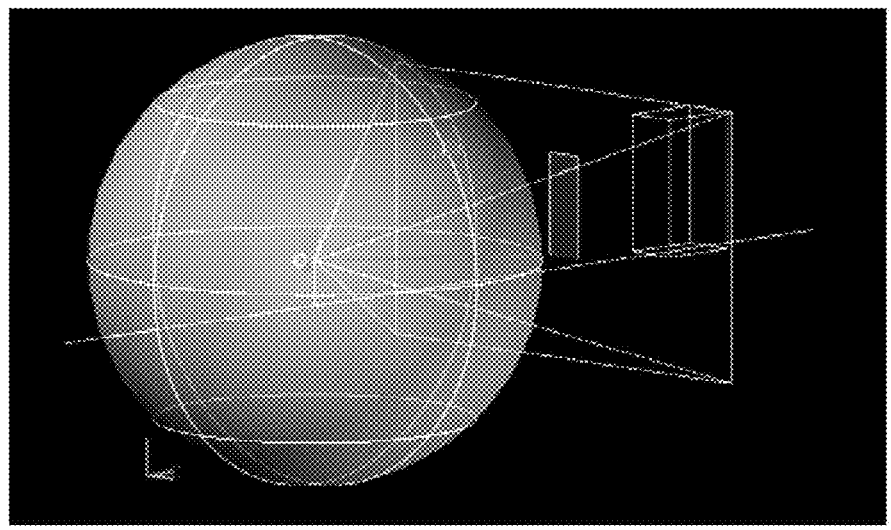
FIG. 1C is a principle diagram of setting a spherical center O of a preset sphere as a photographing viewport according to an embodiment of the present invention.
Figure 1D:
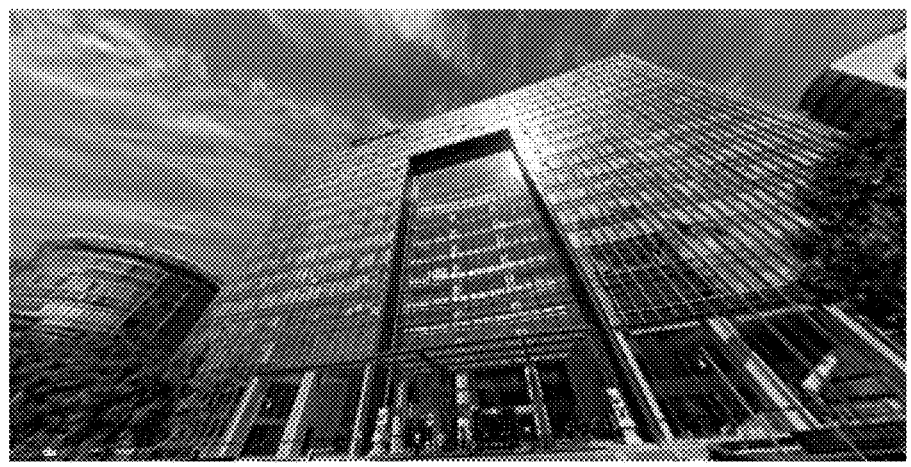
FIG. 1D is a picture with the wide-angle distortion eliminated after being mapped to the photographing viewport according to an embodiment of the present invention.

Furthermore, after the original picture is projected to the surface of the preset sphere to form the projected picture, a spherical center of the preset sphere is set as a photographing viewport, and the projected picture is mapped into the photographing viewport, thus eliminating a wide-angle distortion in the two-dimensional original picture. As shown in FIG. 1C, after a panoramic picture under a two-dimensional condition is attached as a texture to a surface of a three-dimensional sphere model to form a projected picture, the spherical center O of the sphere is used as a photographing viewport, and the projected picture is mapped into the viewport. FIG. 1D shows the projected picture whose wide-angle distortion is eliminated after being mapped.

The viewport is equivalent to a photographing window during a camera imaging process, and therefore the above operations are equivalent to photographing the projected picture to eliminate the wide-angle distortion by using the imaging principle of a camera.

At step S103, an edge detection is performed on the building image in the projected picture to acquire a pixel height of the building image.

In the above operation, the purpose of performing an edge detection on the building image in the projected picture is to determine a top boundary of the building image, so as to determine the distance between the top boundary of the building image and the lower edge of the projected picture, and to use the distance as the pixel height of the building image for a subsequent analysis on the actual height of the building.

The edge detection refers to detecting a discontinuity in brightness values at the image edge in the projected picture. Such a discontinuity is usually determined by solving a first derivative or a second derivative of the image in the picture. The first derivative of the image refers to the pixel gradient of the image. That is to say, the image edge may be detected by using the method of solving the first derivative of the image. Alternatively, the image edge may be detected by using the method of solving the second derivative of the image. Detecting the image edge by using the method of solving the first derivative of the image refers to detecting the image edge by using the pixel gradient of the image.

Figure 1E:
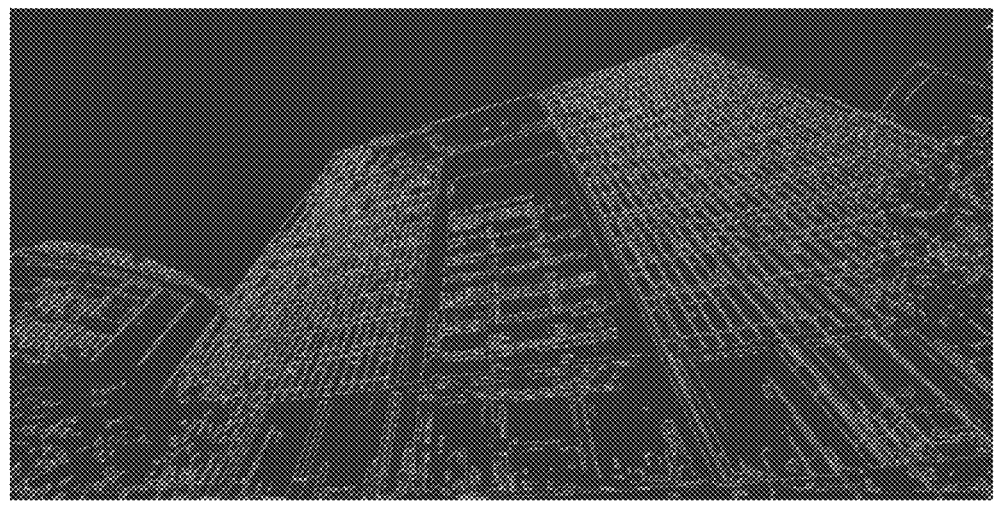
FIG. 1E is a picture obtained by performing an edge detection on a projected picture according to an embodiment of the present invention.

Preferably, in this embodiment, the performing edge detection on the building image in the projected picture by using the pixel gradient of the image specifically includes:

calculating the pixel gradient of the building image in the projected picture; searching, downward from above a center point of the projected picture, for an upper edge of the building image based on the pixel gradient, and using the upper edge as a top boundary of the building image; and calculating a distance between the top boundary and a lower edge of the projected picture and using the distance as the pixel height of the building image. FIG. 1E is a schematic diagram of determining the top boundary of the building image by calculating the pixel gradient of the building image.

It should be noted that the detection of the upper edge of the building image is not limited to the manner of searching downward from the center point of the projected picture, but may further include searching downward or upward from one side edge of the projected picture. However, no matter at what angle the original picture including the building image is captured, the building is preferentially arranged generally at the center of the original picture, so as to ensure the integrity of the building image in the original picture as much as possible. Therefore, the upper edge of the building image is usually found by searching downward from above the center point of the projected picture based on the calculated pixel gradient of the building image, which is advantageous in that some areas can be searched more pertinently, so as to reduce the time required by the search, thereby improving the efficiency of the building height acquisition.

After the upper edge of the building image is found, the upper edge is determined as the top boundary of the building image, and thus the pixel height of the building image is determined by using the distance between the top boundary and the lower edge of the projected picture. For example, assuming that coordinates of the top boundary in the viewport of the three-dimensional sphere model are $(x1, y1, z1)$ and coordinates of the lower edge having the same x-axis and y-axis coordinates as the top boundary in the projected picture are $(x1, y1, z2)$, the pixel height of the building is expressed as $|z1-z2|$.

Furthermore, before the calculating the distance between the top boundary and the lower edge of the projected picture and using the distance as the pixel height of the building, preferably, it may be judged, based on the top boundary, whether a preset area of the top boundary is filled with a same color. If the preset area is filled with different colors, the projected picture is discarded; and if the preset area is filled with a same color, subsequent operations are executed.

Generally, there is a continuous area filled with a fixed color above the building image. It may be detected, by judging whether the preset area of the top boundary is filled with a same color, whether there is a small object such as a piece of leaf or a lamp post that affects the determination of the top boundary of the building.

At step S104, a projection angle of the projection is determined on the preset sphere based on the pixel height of the building.

The projection angle θ of the building image in the sphere model may be determined based on a ratio of the pixel height of the building image to the projected picture and the projection angle corresponding to the picture projected in the sphere. Typically, when the viewport is set, the projection angle corresponding to the viewport may be determined, and a ratio of the projection angle to the viewport may be calculated based on the ratio of the pixel height of the building to the height of the entire picture. Therefore, the projection angle corresponding to the building image can be calculated.

At step S105, a height of the building is determined based on the projection angle and a distance between the building and a capturing position of the original picture.

Figure 1F:
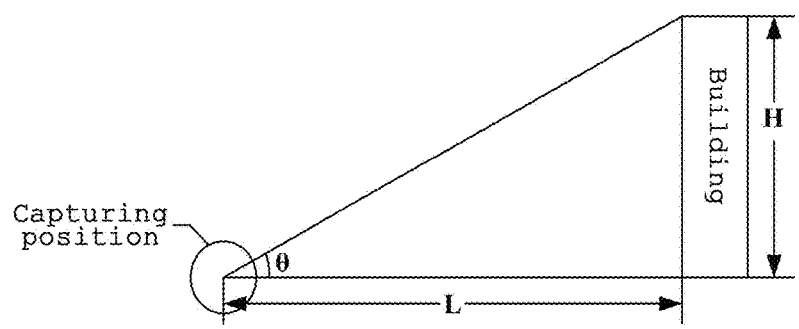
FIG. 1F is a principle diagram of determining the height H of a building according to a projection angle θ and a distance L between the building and a capturing position in an original picture according to an embodiment of the present invention.

As shown in FIG. 1F, provided that the projection angle θ of the building image in the sphere model is determined, the height H of the building may be determined by using a tangent function in a right triangle formed by the height H of the building and the distance L between the building and the capturing position of the original picture, that is, $H=L*\tan\theta$.

In the technical solution of this embodiment, an original picture including an image of a building is acquired; the original picture is projected on a preset sphere model to form a projected picture; an edge detection is performed on the building image to acquire a pixel height of the building image; a projection angle of the projection on the sphere model is determined based on the pixel height; and finally, the height of the building is calculated based on the obtained projection angle and a distance between the building and a capturing position of the original picture. The method can obtain the height of the building automatically and quickly based on the picture without manual involvements, thus reducing the cost of acquisition while improving the acquisition efficiency.

The Second Embodiment

Figure 2A:
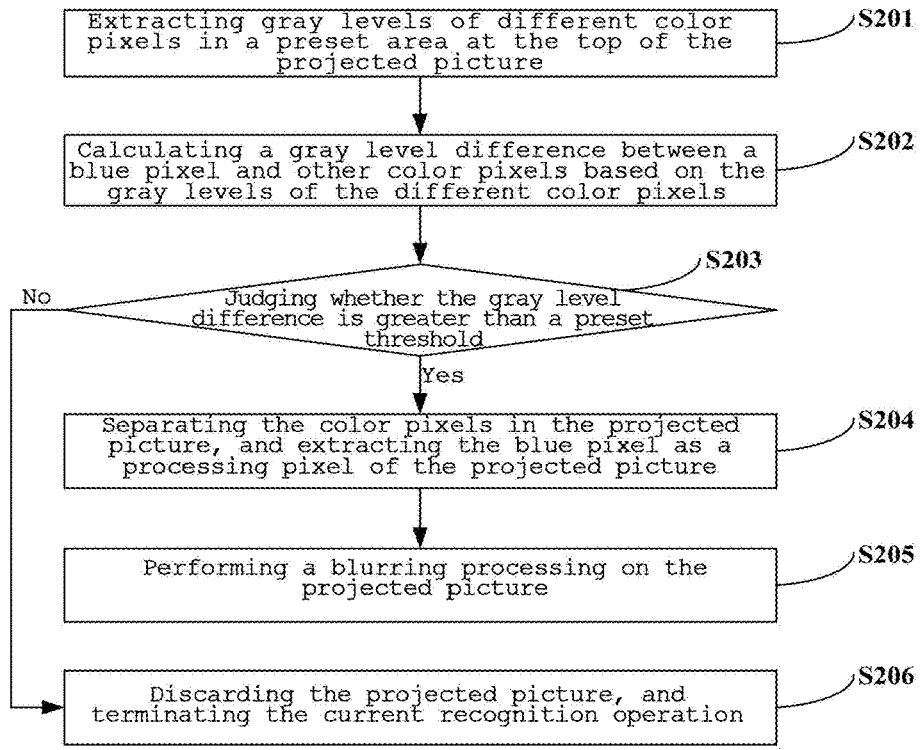
FIG. 2A is a flowchart of a building height calculation method according to a second embodiment of the present invention.

FIG. 2A is a flowchart of a building height calculation method according to a second embodiment of the present invention. Based on the first embodiment described above, in this building height calculation method, the picture may be pre-processed before the pixel height of the building is determined in order to remove interfering objects in the picture, thereby improving the accuracy of the calculation. There are various methods for pre-processing, which may be used separately or in combination.

Before the edge detection is performed on the building image in the projected picture, the method further includes the following steps.

At step S201, gray levels of different color pixels are extracted in a preset area at the top of the projected picture.

Because pixels are usually displayed in three primary colors: red, green, and blue, gray levels of the pixels of the three different colors may be extracted respectively.

At step S202, a gray level difference between a blue pixel and other color pixels is calculated based on the gray levels of the different color pixels.

In addition to the building image, the projected picture may further include other images around the building. For example, in the projected picture, there may be an image of the blue sky or other interfering buildings such as an overpass above the building image. As the overpass or other large-size artificial buildings may affect the estimation of the height of the target building, the height of the building can be estimated more accurately when the background of the picture is the blue sky. Therefore, the gray level difference between the blue pixel and other color pixels is calculated so as to recognize the blue sky.

The preset area at the top of the projected picture refers to an area that may include an image of the blue sky image or images of other interfering buildings. The area may be set empirically. If the area is set too large, the amount of computation is increased. If the area is set too small, it is possible that the purpose of recognizing the blue sky cannot be achieved.

Specifically, the gray level difference between the blue pixel and other color pixels is obtained by comparing the gray level of the above blue pixel with the gray levels of other color pixels, and it is further judged in subsequent operations whether the projected picture meets a requirement based on the gray level difference. If the projected picture meets the requirement, the gray level of the blue pixel should be obviously greater than the gray levels of other color pixels. Besides, the gray level of the blue pixel and the gray levels of other color pixels should be greater than zero rather than close to zero.

At step S203, it is judged whether the gray level difference is greater than a preset threshold. If the gray level difference is greater than the preset threshold, steps S204-S205 are executed; otherwise, step S206 is executed.

The preset threshold refers to a preset gray level for judging whether the projected picture meets a requirement. The purpose of setting the preset threshold is to accurately judge whether the projected picture meets the requirement.

It should be noted that, whether the projected picture meets the requirement may be judged based on whether the gray level difference is greater than zero. If the projected picture meets the requirement, the area at the top of the projected picture should be an image of the blue sky. In this case, the gray level of the blue pixel is obviously greater than the gray levels of other color pixels, that is, the gray level difference is greater than zero. However, it should be noted that, when the gray level of the blue pixel and the gray levels of other color pixels exist while the gray levels of these pixels are only slightly different, the gray level difference is close to zero. As a result, the top boundary of the building image cannot be determined accurately in subsequent operations. In this case, the projected picture does not meet the requirement. Therefore, in this embodiment, a preset threshold is preferably determined in advance. It is judged whether the gray level difference is greater than the preset threshold to accurately determine whether the projected picture meets the requirement.

At step S204, the color pixels in the projected picture are separated, and the blue pixel is extracted as a processing pixel of the projected picture.

Figure 2B:
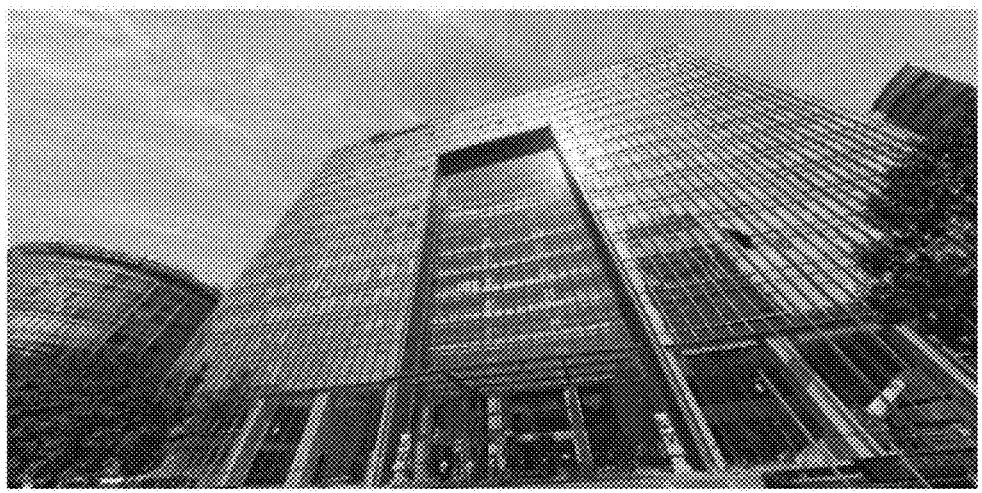
FIG. 2B is a picture obtained by separating the color pixels in a projected picture and extracting a blue pixel of a blue channel picture as a processing pixel according to an embodiment of the present invention.

When the detected gray level difference is greater than the preset threshold, color pixels in the projected picture are separated. Pictures of the three primary colors, that is, a blue channel picture, a red channel picture, and a green channel picture are obtained after the separation, and a blue pixel of the blue channel picture is extracted as a processing pixel to eliminate interference from clouds, rainfall or other natural phenomena. In addition, this operation may further adjust the size of the projected picture, thus facilitating subsequent calculations and operations. FIG. 2B shows a picture obtained by processing the blue channel picture to eliminate interference from clouds, rainfall or other natural phenomena.

At step S205, a blurring processing is performed on the projected picture to filter out noise in the projected picture.

Figure 2C:
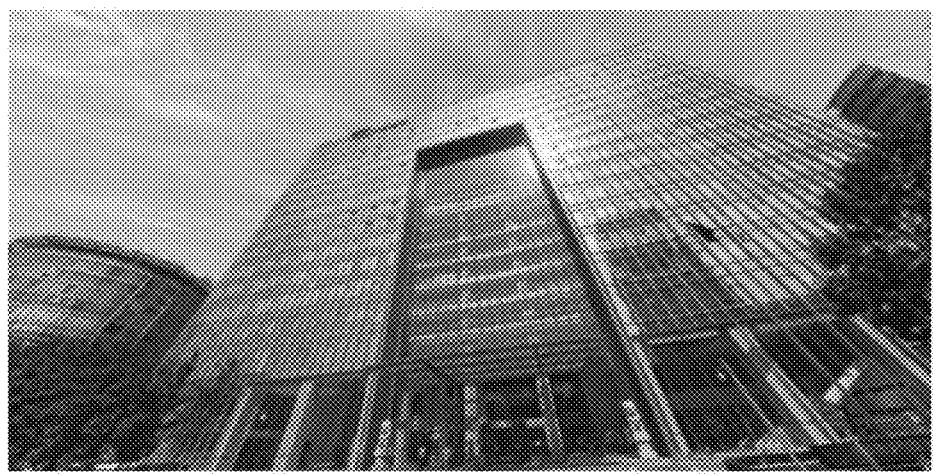
FIG. 2C is a picture obtained by filtering and denoising a projected picture with a Gaussian algorithm according to an embodiment of the present invention.

During the imaging, transmission and transformation of an image, affected by various random noises, for example, small objects such as birds and high-voltage power lines, the picture becomes coarse, the image quality is reduced, or even worse, main features in the image are overwhelmed. To reduce the noise and restore a real image, the image needs to be filtered and denoised. There are many methods for filtering and denoising the image, for example, a linear filtering algorithm, a non-linear filtering algorithm or a Wiener filtering algorithm. Among others, a Gaussian algorithm in the linear filtering algorithms is the most commonly used. In this embodiment, a blurring processing is preferably performed on the projected picture by using the Gaussian algorithm to implement a filtering and denoising, so as to eliminate the effect on the image quality imposed by small objects such as birds and high-voltage power lines when the panoramic picture is generated. FIG. 2C shows a picture obtained by filtering and denoising a projected picture with a Gaussian algorithm according to this embodiment.

At step S206, the projected picture is discarded, and the current recognition operation is terminated.

When the detected gray level difference is smaller than the preset threshold, it is determined that an interfering building is recognized in the top part of the projected picture. For example, there is an interfering building such as a bridge in the top part of the projected picture. Alternatively, it is determined that the captured building image recognized in the projected picture is incomplete. As a result, the upper edge of the building image cannot be detected accurately in subsequent operations, and the top boundary of the building image cannot be further determined. Consequently, the pixel height of the building cannot be determined. In this case, the projected picture is directly discarded, and the current recognition operation is terminated.

In the technical solution of this embodiment, the gray level difference between the blue pixel and other color pixels is obtained by comparing the gray levels of different color pixels in the preset area at the top of the projected picture. It is further determined whether the projected picture meets a requirement based on the gray level difference. If the projected picture meets the requirement, subsequent operations are performed on the projected picture; otherwise, the projected picture is directly discarded. In the method, before the edge detection is performed on the building image in the projected picture, it is determined whether the projected picture meets the requirement based on the gray levels of different color pixels. As a consequence, the edge detection is performed only when the projected picture meets the requirement, thus enabling the subsequent operations to be more pertinent and further improving the efficiency of the building height acquisition.

The Third Embodiment

Figure 3:
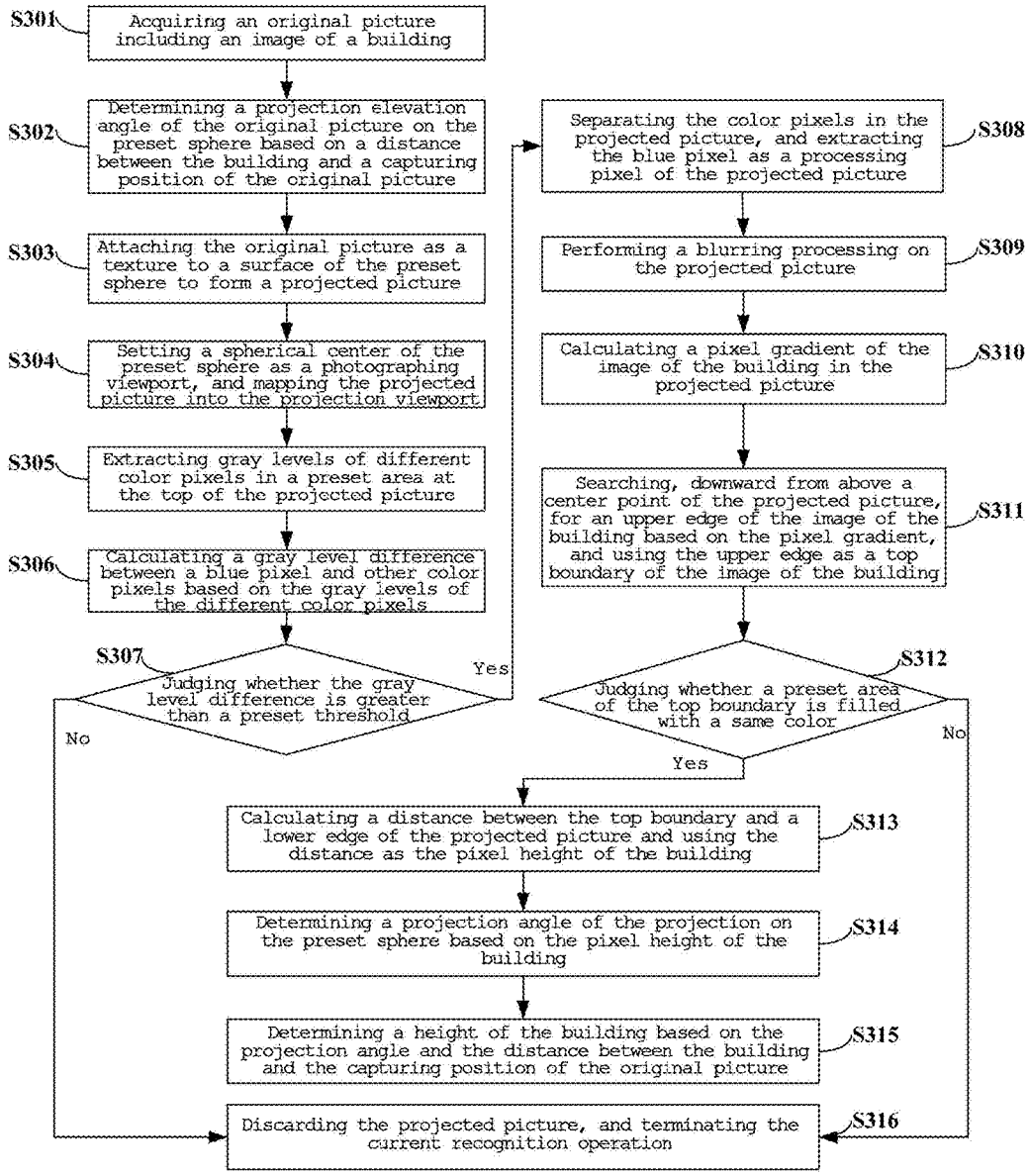
FIG. 3 is a flowchart of a building height calculation method according to a third embodiment of the present invention.

FIG. 3 is a flowchart of a building height calculation method according to an embodiment of the present invention. This embodiment provides a preferable embodiment based on the above embodiments.

Referring to FIG. 3, the method of this embodiment includes the following operations.

At step S301, an original picture including an image of a building is acquired.

At step S302, a projection elevation angle of the original picture on the preset sphere is determined based on a distance between the building and a capturing position of the original picture.

At step S303, the original picture is attached as a texture to the surface of the preset sphere to form a projected picture.

At step S304, a spherical center of the preset sphere is set as a photographing viewport, and the projected picture is mapped into the projection viewport to eliminate a wide-angle distortion of the panoramic picture.

At step S305, gray levels of different color pixels in a preset area at the top of the projected picture are extracted.

At step S306, a gray level difference between a blue pixel and other color pixels is calculated based on the gray levels of the different color pixels.

At step S307, it is judged whether the gray level difference is greater than a preset threshold. if the gray level difference is greater than a preset threshold, steps S308-S312 are executed; otherwise, step S316 is executed.

At step S308, the color pixels in the projected picture are separated, and the blue pixel is extracted as a processing pixel of the projected picture.

At step S309, a blurring processing is performed on the projected picture to filter out noise in the projected picture.

At step S310, a pixel gradient of the building image in the projected picture is calculated.

At step S311, an upper edge of the building image is searched, based on the pixel gradient, downward from above a center point of the projected picture, and used as a top boundary of the building image.

At step S312, it is judged, based on the top boundary, whether a preset area of the top boundary is filled with a same color. If the preset area of the top boundary is filled with a same color, steps S313-S315 are executed; otherwise, step S316 is executed.

At step S313, a distance between the top boundary and a lower edge of the projected picture is calculated and used as the pixel height of the building.

At step S314, a projection angle of the projection on the preset sphere is determined based on the pixel height of the building image.

At step S315, the height of the building is determined based on the projection angle and the distance between the building and the capturing position of the original picture.

At step S316, the projected picture is discard.

In this preferred embodiment, an original picture including an image of a building is acquired; the original picture is attached as a texture to a preset sphere model to form a projected picture; a spherical center of the sphere is set as a viewport and the projected picture is mapped into the viewport so as to determine a top boundary of the building image; a pixel height of the building image is determined based on the top boundary; a projection angle of the projection on the sphere model is determined based on the pixel height; and finally, the height of the building is calculated based on the obtained projection angle and a distance between the building and a capturing position of the original picture. The method can obtain the height of the building automatically and quickly based on the picture without manual involvements, thus reducing the cost of acquisition while improving the acquisition efficiency.

In addition, on one hand, before the pixel height of the building image is determined, gray levels of different color pixels in the building image are extracted. It is judged whether the projected picture meets a requirement based on a gray level difference between a blue pixel and other color pixels, and the projected picture is discarded if the projected picture does not meet the requirement. On the other hand, before the pixel height of the building image is determined, it is judged whether the color of a preset area at the top boundary of the building image meets a requirement, and the projected picture is discarded if the color of the preset area does not meet the requirement. The method is further optimized so that the edge detection is only performed on the projected picture that meets the requirement, thereby implementing a more targeted processing, and further improving the efficiency of the building height acquisition.

The Fourth Embodiment

Figure 4A:
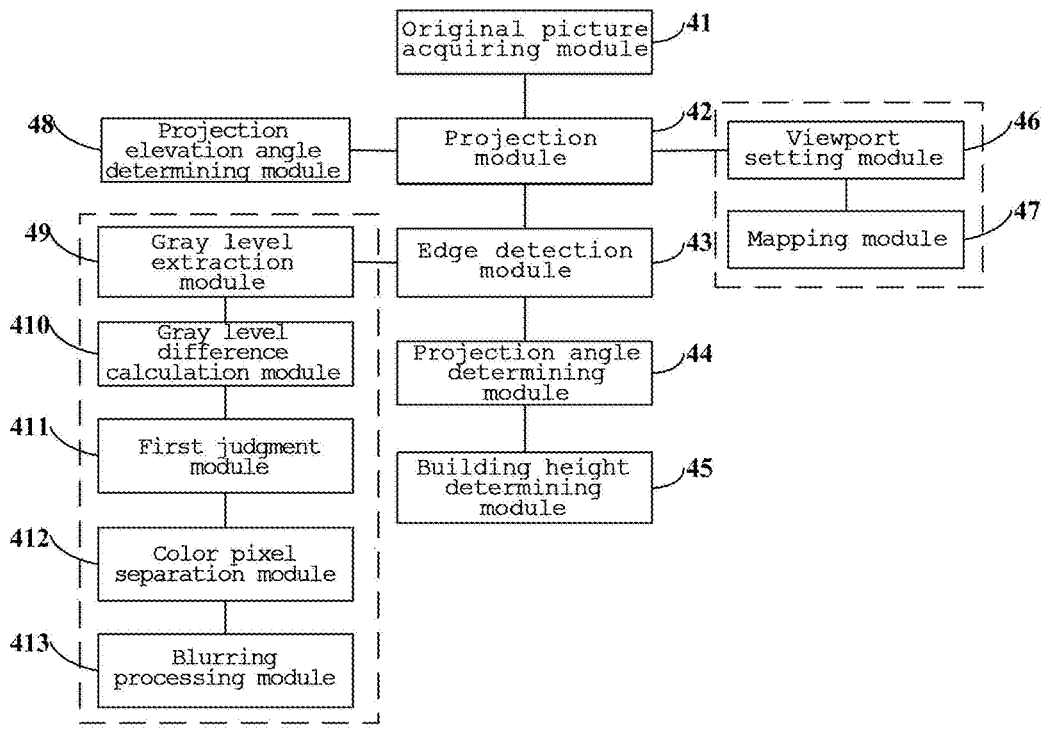
FIG. 4A is a schematic structural diagram of a building height calculation device according to a fourth embodiment of the present invention.

FIG. 4A is a schematic structural diagram of a building height calculation device according to a fourth embodiment of the present invention.

Referring to FIG. 4A, the device of this embodiment specifically includes: an original picture acquiring module 41, a projection module 42, an edge detection module 43, a projection angle determining module 44, and a building height determining module 45.

Specifically, the original picture acquiring module 41 is configured to acquire an original picture including an image of a building.

The projection module 42 is configured to project the original picture to a surface of a preset sphere to form a projected picture.

The edge detection module 43 is configured to perform an edge detection on the building image in the projected picture to acquire a pixel height of the building image.

The projection angle determining module 44 is configured to determine a projection angle of the projection on the preset sphere based on the pixel height of the building.

The building height determining module 45 is configured to determine a height of the building based on the projection angle and a distance between the building and a capturing position of the original picture.

Based on the above solution, the device further includes:

a viewport setting module 46 configured to set a spherical center of the preset sphere as a photographing viewport after the original picture is projected to the surface of the preset sphere to form the projected picture;

a mapping module 47 configured to map the projected picture into the projection viewport to eliminate a wide-angle distortion of the panoramic picture;

a projection elevation angle determining module 48 configured to determine a projection elevation angle of the original picture on the preset sphere based on the distance between the building and the capturing position of the original picture before the original picture is projected to the surface of the preset sphere to form the projected picture;

a gray level extraction module 49 configured to extract gray levels of different color pixels in a preset area at the top of the projected picture before the edge detection is performed on the building image in the projected picture;

a gray level difference calculation module 410 configured to calculate a gray level difference between a blue pixel and other color pixels based on the gray levels of the different color pixels;

a first judgment module 411 configured to judge whether the gray level difference is greater than a preset threshold;

a color pixel separation module 412 configured to separate the color pixels in the projected picture and extract the blue pixel as a processing pixel of the projected picture when the gray level difference is greater than the preset threshold; and a blurring processing module 413 configured to perform a blurring processing on the projected picture to filter out noise in the projected picture.

Figure 4B:
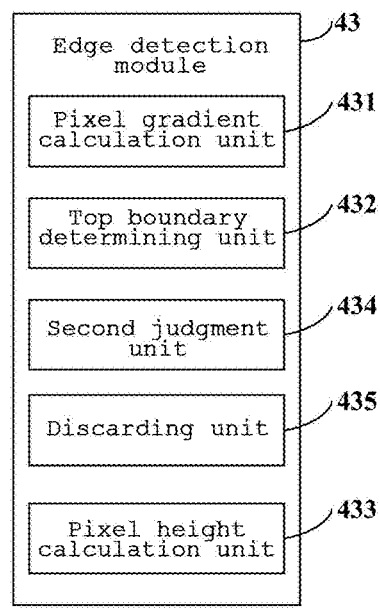
FIG. 4B is a schematic structural diagram of an edge detection module in a building height calculating device according to the fourth embodiment of the present invention.

Preferably, as shown in FIG. 4B, the edge detection module 43 specifically includes:

a pixel gradient calculation unit 431 configured to calculate a pixel gradient of the building image in the projected picture;

a top boundary determining unit 432 configured to search, downward from above a center point of the projected picture, for an upper edge of the building image based on the pixel gradient, and use the upper edge as a top boundary of the building image; and a pixel height calculation unit 433 configured to calculate a distance between the top boundary and a lower edge of the projected picture and use the distance as the pixel height of the building.

Furthermore, the edge detection module 43 of the device further includes:

a second judgment unit 434 configured to judge, based on the top boundary, whether a preset area of the top boundary is filled with a same color before the distance between the top boundary and the lower edge of the projected picture is calculated and used as the pixel height of the building; and a discarding unit 435 configured to discard the projected picture when the preset area is filled with different colors.

According to the device provided by the technical solution of this embodiment, the edge detection module 43 is used for performing an edge detection on the building image to acquire the pixel height of the building image, the projection angle determining module 44 is used for determining the projection angle of the projection on the preset sphere based on the pixel height of the building image, and the building height determining module 45 is used for finally determining the height of the building based on the projection angle and the distance between the building and the capturing position of the original picture. The device can obtain the height of the building automatically and quickly based on the image without manual involvements, thus reducing the cost of acquisition while improving the acquisition efficiency.

In addition, the first judgment module 411 is further used for judging whether the gray level difference between different color pixels in the preset area at the top of the projected picture meets a requirement. If the gray level difference does not meet the requirement, the projected picture is discarded. The second judgment unit 434 is used for judging whether the preset area of the top boundary of the building image in the projected picture is filled with a same color. If the preset area is not filled with a same color, the projected picture is discarded. The device is further optimized so that the edge detection is only performed on the projected picture that meets the requirement, thereby implementing a more targeted processing and further improving the acquisition efficiency.

The Fifth Embodiment

This embodiment provides a non-volatile computer storage medium, the computer storage medium storing one or more modules. When the one or more modules are executed by an apparatus that executes a building height calculation method, the apparatus is caused to execute the following operations:

acquiring an original picture including an image of a building;

projecting the original picture to a surface of a preset sphere to form a projected picture;

performing an edge detection on the building image in the projected picture to acquire a pixel height of the building image;

determining a projection angle of the projection on the preset sphere based on the pixel height of the building; and determining a height of the building based on the projection angle and a distance between the building and a capturing position of the original picture.

When the modules stored in the above storage medium are executed by the apparatus, the original picture may preferably be a panoramic picture of the building that is captured from bottom to top.

When the modules stored in the above storage medium are executed by the apparatus, after the original picture is projected to the surface of the preset sphere to form the projected picture, the method may further include:

setting a spherical center of the preset sphere as a photographing viewport; and mapping the projected picture into the projection viewport to eliminate a wide-angle distortion of the panoramic picture.

When the modules stored in the above storage medium are executed by the apparatus, before the original picture is projected to the surface of the preset sphere to form the projected picture, the method may further include:

determining a projection elevation angle of the original picture on the preset sphere based on the distance between the building and the capturing position of the original picture.

When the modules stored in the above storage medium are executed by the apparatus, before the edge detection is performed on the building image in the projected picture, the method may further include:

extracting gray levels of different color pixels in a preset area at the top of the projected picture;

calculating a gray level difference between a blue pixel and other color pixels based on the gray levels of the different color pixels;

separating the color pixels in the projected picture and extracting the blue pixel as a processing pixel of the projected picture, if the gray level difference is greater than a preset threshold; and performing a blurring processing on the projected picture to filter out noise in the projected picture.

When the modules stored in the above storage medium are executed by the apparatus, the performing of the edge detection on the building image in the projected picture to acquire the pixel height of the building image may preferably include:

calculating a pixel gradient of the building image in the projected picture;

searching, downward from above a center point of the projected picture, for an upper edge of the building image based on the pixel gradient, and using the upper edge as a top boundary of the building image; and calculating a distance between the top boundary and a lower edge of the projected picture and using the distance as the pixel height of the building.

When the modules stored in the above storage medium are executed by the apparatus, before the distance between the top boundary and the lower edge of the projected picture is calculated and used as the pixel height of the building, the method may further include:

judging, based on the top boundary, whether a preset area of the top boundary is filled with a same color. If the preset area is filled with different colors, the projected picture is discarded; and if the preset area is filled with a same color, subsequent operations are performed.

The Sixth Embodiment

Figure 5:
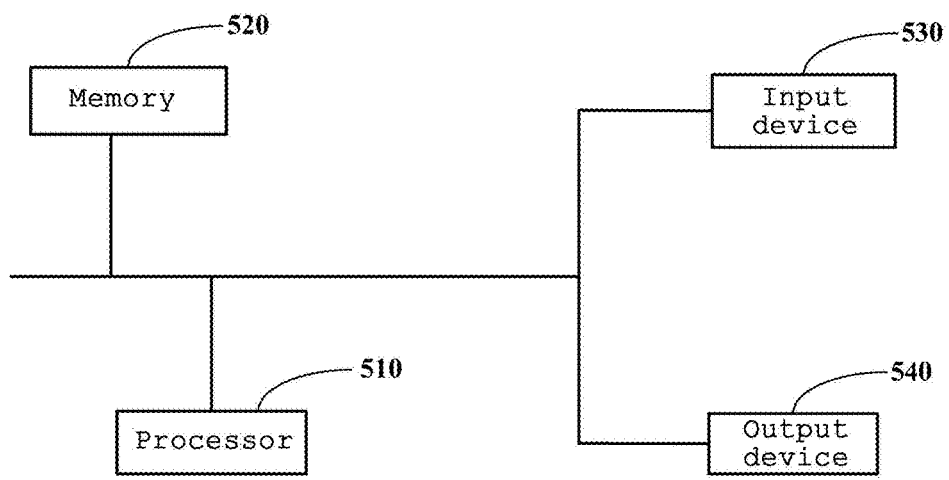
FIG. 5 is a schematic structural diagram of hardware of an apparatus for executing a building height calculation method according to a sixth embodiment of the present invention.

FIG. 5 is a schematic structural hardware diagram of an apparatus for executing a building height calculation method according to a sixth embodiment of the present invention.

The apparatus includes:

one or more processors 510, where FIG. 5 takes one processor 510 as an example;

a memory 520; and one or more modules.

The apparatus may further include: an input device 530 and an output device 540. The processor 510, the memory 520, the input device 530, and the output device 540 in the apparatus may be connected via a bus or in other manners. FIG. 5 takes the connection via a bus as an example.

As a computer readable storage medium, the memory 520 may be used for storing software programs, computer executable programs and modules, for example, program instructions/modules corresponding to the building height calculation method in the embodiments of the present invention (for example, the original picture acquiring module 41, the projection module 42, the edge detection module 43, the projection angle determining module 44, and the building height determining module 45 shown in FIG. 4A). The processor 510 runs the software programs, instructions, and modules stored in the memory 520 to execute various functional applications and data processing of a server, so as to implement the building height calculation method in the above method embodiment.

The memory 520 may include a program storage area and a data storage area. The program storage area may store an operating system and an application program required by at least one function. The data storage area may store data created according to the use of the terminal apparatus, and so on. In addition, the memory 520 may include a high speed random access memory, and may further include a non-volatile memory, for example, at least one magnetic disk storage device, a flash memory device, or other non-volatile solid-state storage devices. In some embodiments, the memory 520 may further include memories disposed remote to the processor 510. These remote memories may be connected to the terminal apparatus through a network. Examples of the network include, but not limited to, internet, an enterprise intranet, a local area network, a mobile communication network, and a combination thereof.

The input device 530 can be used for receiving input digital or character information, and generating key signal inputs related to user settings of the terminal and functional controls. The output device 540 may include a display screen or other display devices.

The one or more modules are stored in the memory 520, and when the one or more modules are executed by the one or more processors 510, the following operations are executed:

acquiring an original picture including an image of a building;

projecting the original picture to a surface of a preset sphere to form a projected picture;

performing an edge detection on the building image in the projected picture to acquire a pixel height of the building image;

determining a projection angle of the projection on the preset sphere based on the pixel height of the building; and determining a height of the building based on the projection angle and a distance between the building and a capturing position of the original picture.

Furthermore, the original picture may specifically be a panoramic picture of the building that is captured from bottom to top.

Furthermore, after the original picture is projected to the surface of the preset sphere to form the projected picture, the method may further include:

setting a spherical center of the preset sphere as a photographing viewport; and mapping the projected picture into the projection viewport to eliminate a wide-angle distortion of the panoramic picture.

Furthermore, before the original picture is projected to the surface of the preset sphere to form the projected picture, the method may further include:

determining a projection elevation angle of the original picture on the preset sphere based on the distance between the building and the capturing position of the original picture.

Furthermore, before the edge detection is performed on the building image in the projected picture, the method may further include:

extracting gray levels of different color pixels in a preset area at the top of the projected picture;

calculating a gray level difference between a blue pixel and other color pixels based on the gray levels of the different color pixels;

separating the color pixels in the projected picture and extracting the blue pixel as a processing pixel of the projected picture, if the gray level difference is greater than a preset threshold; and performing a blurring processing on the projected picture to filter out noise in the projected picture.

Furthermore, the performing of the edge detection on the building image in the projected picture to acquire the pixel height of the building image may include:

calculating a pixel gradient of the building image in the projected picture;

searching, downward from above a center point of the projected picture, for an upper edge of the building image based on the pixel gradient, and using the upper edge as a top boundary of the building image; and calculating a distance between the top boundary and a lower edge of the projected picture and using the distance as the pixel height of the building.

Furthermore, before the distance between the top boundary and the lower edge of the projected picture is calculated and used as the pixel height of the building, the method may further include:

judging, based on the top boundary, whether a preset area of the top boundary is filled with a same color. If the preset area is filled with different colors, the projected picture is discarded; and if the preset area is filled with a same color, subsequent operations are performed.

According to the descriptions of the above embodiments, one skilled in the art may clearly understand that the present invention can be implemented by means of software and necessary general-purpose hardware, and can be implemented, obviously, by means of hardware. However, the former is a preferred implementation in most cases. Based on such an understanding, the technical solutions of the present invention, or the part contributing to the prior art can be essentially embodied in the form of a software product. The computer software product may be stored in a computer readable storage medium, such as a computer floppy disk, a read-only memory (ROM), a random access memory (RAM), a flash, a magnetic disk, and an optical disc, and includes several instructions for enabling a computer device (which may be a personal computer, a server, a network device, or the like) to execute the methods described in the embodiments of the present invention.

It should be noted that, in the above embodiments of the building height calculation device, the referred units and modules are merely divided according to a functional logic, but the present invention is not limited to the above division manner, as long as the corresponding functions can be achieved. In addition, the specific names of the functional units are merely used for distinguishing, and are not intended to limit the scope of the present invention.

The above descriptions are merely specific embodiments of the present invention, and the scope of the present invention is not limited thereto. Any changes or replacements that can be easily conceived of by one skilled in the art within the technical scope disclosed by the present invention should be covered by the scope of the present invention. Therefore, the scope of the present invention should be interpreted as the scope sought to be protected by the claims.

What is claimed is:

1. A building height calculation method, comprising:
    acquiring an original picture comprising an image of a building;
    projecting the original picture to a surface of a three-dimensional sphere model to form a projected picture, by attaching the original picture as a texture to the surface of the three-dimensional sphere model;
    setting a spherical center of the three-dimensional sphere model as a photographing viewport;
    mapping the projected picture into the photographing viewport to eliminate a wide-angle distortion of the original picture;
    performing an edge detection on the image of the building in the mapped projected picture to acquire a pixel height of the image of the building;
    determining a projection angle of the projection on the three-dimensional sphere model based on the pixel height of the building; and
    determining a height of the building based on the projection angle and a distance between the building and a capturing position of the original picture, wherein the performing the edge detection on the image of the building in the projected picture to acquire the pixel height of the image of the building comprises:
    calculating a pixel gradient of the image of the building in the projected picture;
    searching, downward from above a center point of the projected picture, for an upper edge of the image of the building based on the pixel gradient, and using the upper edge as a top boundary of the image of the building; and
    calculating a distance between the top boundary and a lower edge of the projected picture and using the distance as the pixel height of the building.

2. The method according to claim 1, wherein the original picture is a panoramic picture of the building captured from bottom to top.

3. The method according to claim 1, before the performing the edge detection on the image of the building in the projected picture, the method further comprising:
    extracting gray levels of different color pixels in a preset area at a top of the projected picture;
    calculating a gray level difference between a blue pixel and other color pixels based on the gray levels of the different color pixels;
    judging whether the gray level difference is greater than a preset threshold;
    separating the color pixels in the projected picture and extracting the blue pixel as a processing pixel of the projected picture in response to the gray level difference being greater than a preset threshold; and
    performing a blurring processing on the projected picture to filter out noise in the projected picture.

4. The method according to claim 1, before the calculating the distance between the top boundary and the lower edge of the projected picture and using the distance as the pixel height of the building, the method further comprising:
    judging, based on the top boundary, whether a preset area of the top boundary is filled with a same color; and
    discarding the projected picture when the preset area is filled with different colors.

5. A building height calculation device, comprising:
    at least one processor; and
    a memory storing instructions, which when executed by the at least one processor, cause the at least one processor to perform operations, the operations comprising:
    acquiring an original picture comprising an image of a building;
    projecting the original picture to a surface of a three-dimensional sphere model to form a projected picture, by attaching the original picture as a texture to the surface of the preset sphere;
    setting a spherical center of the three-dimensional sphere model as a photographing viewport;
    mapping the projected picture into the photographing viewport, to eliminate a wide-angle distortion of the original picture;

performing an edge detection on the image of the building in the projected picture to acquire a pixel height of the image of the building;

determining a projection angle of the projection on the three-dimensional sphere model based on the pixel height of the building; and determining a height of the building based on the projection angle and a distance between the building and a capturing position of the original picture, wherein the performing the edge detection on the image of the building in the projected picture to acquire the pixel height of the image of the building comprises:

calculating a pixel gradient of the image of the building in the projected picture;

searching, downward from above a center point of the projected picture, for an upper edge of the image of the building based on the pixel gradient, and using the upper edge as a top boundary of the image of the building; and calculating a distance between the top boundary and a lower edge of the projected picture and using the distance as the pixel height of the building.

6. The device according to claim 5, wherein the original picture is a panoramic picture of the building captured from bottom to top.

7. The device according to claim 5, wherein the operations further comprise:

extracting gray levels of different color pixels in a preset area at a top of the projected picture before the edge detection is performed on the image of the building in the projected picture;

calculating a gray level difference between a blue pixel and other color pixels based on the gray levels of the different color pixels;

judging whether the gray level difference is greater than a preset threshold;

separating the color pixels in the projected picture and extract the blue pixel as a processing pixel of the projected picture when the gray level difference is greater than the preset threshold; and performing a blurring processing on the projected picture to filter out noise in the projected picture.

8. The device according to claim 5, wherein the performing the edge detection on the image of the building in the projected picture to acquire the pixel height of the image of the building further comprises:

judging, based on the top boundary, whether a preset area of the top boundary is filled with a same color before the distance between the top boundary and the lower edge of the projected picture is calculated and used as the pixel height of the building; and discarding the projected picture when the preset area is filled with different colors.

9. A non-transitory computer storage medium, the computer storage medium storing one or more modules, wherein when the one or more modules are executed by an apparatus that executes a building height calculation method, the apparatus is caused to execute the following operations:

acquiring an original picture comprising an image of a building;

projecting the original picture to a surface of a three-dimensional sphere model to form a projected picture, by attaching the original picture as a texture to the surface of the three-dimensional sphere model;

setting a spherical center of the three-dimensional sphere model as a photographing viewport;

mapping the projected picture into the photographing viewport to eliminate a wide-angle distortion of the original picture;

performing an edge detection on the image of the building in the projected picture to acquire a pixel height of the image of the building;

determining a projection angle of the projection on the three-dimensional sphere model according to the pixel height of the building; and determining a height of the building based on the projection angle and a distance between the building and a capturing position of the original picture, wherein the performing the edge detection on the image of the building in the projected picture to acquire the pixel height of the image of the building comprises:

calculating a pixel gradient of the image of the building in the projected picture;

searching, downward from above a center point of the projected picture, for an upper edge of the image of the building based on the pixel gradient, and using the upper edge as a top boundary of the image of the building; and calculating a distance between the top boundary and a lower edge of the projected picture and using the distance as the pixel height of the building.

\* \* \* \* \*